United States Patent
Paine et al.

[15] 3,637,051
[45] Jan. 25, 1972

[54] IMPACT ENERGY ABSORBING SYSTEM UTILIZING FRACTURABLE MATERIAL

[72] Inventors: T. O. Paine, Administrator of the National Aeronautics and Space Administration with respect to an invention of; Earl R. Collins, Jr., LaCanada, Calif.

[22] Filed: Sept. 15, 1969

[21] Appl. No.: 857,967

[52] U.S. Cl. ........................188/1 B, 188/1 C, 188/268
[51] Int. Cl. .........................................................F16d 63/00
[58] Field of Search................................188/1 B, 1 C, 268

[56] References Cited

UNITED STATES PATENTS

| | | | |
|---|---|---|---|
| 3,010,540 | 11/1961 | Dahlen | 188/1 C |
| 3,110,262 | 11/1963 | West | 188/101 X |
| 3,265,163 | 8/1966 | Gilbert et al. | 188/1 C X |

Primary Examiner—George E. A. Halvosa
Attorney—G. T. McCoy, J. H. Warden and Monte F. Mott

[57] ABSTRACT

A shock absorber particularly suited for use as a protective barrier in an impact energy absorbing system, characterized by the utilization of a myriad of contiguous spheres arranged in multiple strata for absorbing forces developed on impact, a feature of the shock absorber being the employment of a brittle material in the fabrication of the spheres, whereby payload rebound is inhibited and impact force dissipation is enhanced through a sequential fracture and collapse of successive strata of spheres.

8 Claims, 4 Drawing Figures

PATENTED JAN 25 1972

3,637,051

INVENTOR
EARL R. COLLINS JR.

ATTORNEYS

IMPACT ENERGY ABSORBING SYSTEM UTILIZING FRACTURABLE MATERIAL

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The invention relates to shock absorbers and more particularly to a self-destructing shock absorber wherein impact energy is dissipated through a destruction of the device.

2. Description of the Prior Art

Shock absorbers designed for repetitive employment normally utilize various types of energy dissipating devices, including resilient devices such as springs, air-filled bags, foam and plastic pads, as well as hydraulic or oleo absorbers, or the like, which dissipate energy by forcing a fluid through a restricted orifice. Attempts have been made to utilize crushable structures such as metallic bodies and natural balsa wood for dissipating energy on a one-shot basis wherein energy is dissipated through the destruction of the device. In most instances, where resilient material is employed in dissipating energy, it is difficult to avoid the tendency of an impacting object to rebound, due to the resiliency of the material employed in such systems. In instances where the absorber is to be employed under conditions of extreme temperatures, such as may be encountered on celestial bodies, difficulty is encountered in using devices which employ fluids forced through restrictive orifices, since the viscosity of the fluid normally will undergo significant change as a heat transfer occurs. In those instances where a natural substance such as balsa wood has been utilized, in one-shot absorbers, difficulty has been experienced in selecting the proper wood to achieve the desired dissipation of forces under varying operative conditions and where metallic containers have been employed, rebound has not been entirely eliminated due to the inherent resiliency of the metal employed. For all of the aforementioned devices, the weight of systems capable of effectively employing them frequently prohibits their use in practical applications. This is particularly true where the system is to be employed in protecting landing capsules for payloads delivered to the surface of a celestial body or delivered by aircraft to an impacting surface.

OBJECTS AND SUMMARY OF THE INVENTION

This invention overcomes many of the aforementioned difficulties by providing a lightweight, simplified absorber which utilizes a novel arrangement of a myriad of contiguous, brittle spheres interposed as a barrier member between impacting surfaces.

Accordingly, an object of the instant invention is to provide an improved shock absorber.

Another object is to provide an improved shock absorber particularly adapted for use in mechanical energy absorbing systems.

Another object is to provide a lightweight, highly effective, shock absorber particularly adapted for use in delivering payloads to the surfaces of celestial bodies.

Another object is to provide a highly efficient, self-destructing, economical shock absorber adapted to be employed in dissipating impact energy by fracturing brittle materials.

Another object is to provide an improved shock absorber, including a myriad of contiguous glass spheres arranged in contiguous strata surrounding a payload in a manner such that as the payload is delivered to an impacting surface of a given body the force of impact is controllably dissipated through a fracture and a collapse of successive strata of spheres.

These together with other objects and advantages of the present invention will subsequently become more clearly apparent upon reference to the following description in the specification and accompanying drawing.

DESCRIPTION OF THE PREFERRED EMBODIMENT

Figure 1:
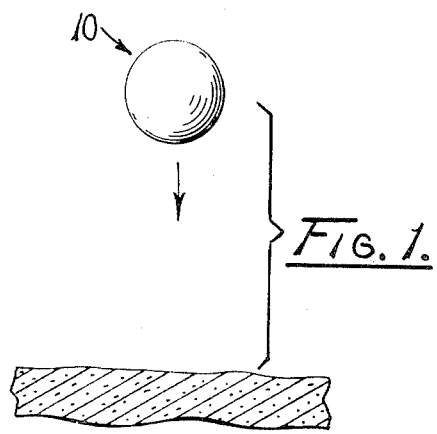
FIG. 1 is a pictorial view of a payload being delivered employing a shock absorber embodying the principles of the present invention.
Figure 2:
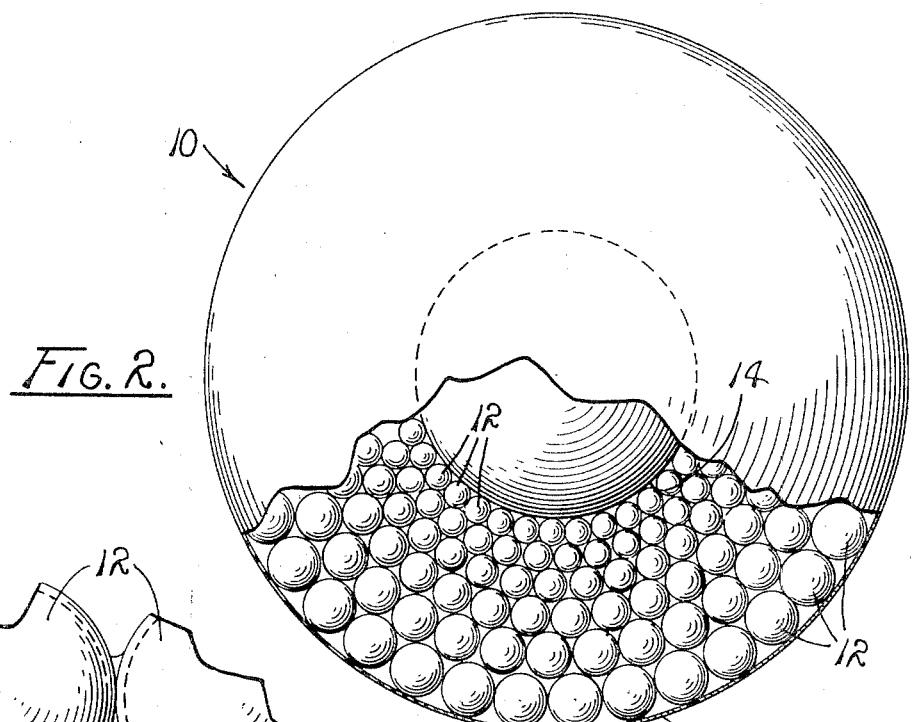
FIG. 2 is a partially sectioned view of the shock absorber of FIG. 1, illustrating the strata of spheres employed in the present invention.
Figure 4:
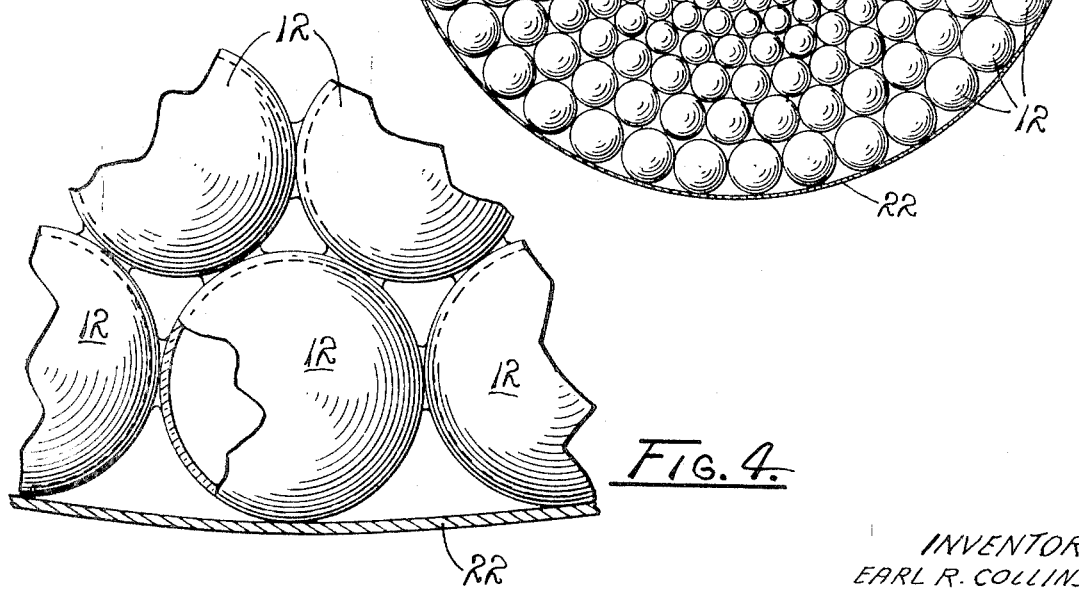
FIG. 4 is a fragmentary view, on somewhat an enlarged scale, of the hollow spheres employed in the shock absorber embodying the principles of the present invention.

Turning now to FIG. 1, therein is pictorially illustrated a payload employing a shock absorber 10 of a type which embodies the principles of the present invention. As best illustrated in FIG. 2, the shock absorber is made up of a myriad of individual spheres 12 arranged in a multiplicity of superimposed spherical layers or strata arranged in supporting engagement with a selected payload 14. While the payload 14 is illustrated as being of a spherical configuration, it is to be understood that the payload may assume any convenient configuration.

In practice, the spheres are formed from any extremely brittle material which is both hard and inelastic. A high grade of silicon glass serves as a convenient material from which the spheres may be fabricated whereby, prior to fracture and collapse of the individual spheres, deformation is minimized so that the impact force may be resisted and then dissipated as a fracture followed by a collapse of the spheres. The sudden fracture and collapse of each of the individual spheres substantially eliminates any tendency of the payload to experience rebound.

As a practical matter, the capability of the individual spheres to withstand impact loads is determined principally by a T/D ratio where T is the thickness of the wall and D is the diameter of the sphere. The maximum stress which a sphere will withstand is a readily determinable value. For purposes of calculating maximum stress, the formula $S = B\,P/t^2$ may be employed, where:

$B$ is a numerical coefficient that depends on $$\mu = \sqrt[4]{12(1-v^2)} \frac{(r_o)}{\sqrt{R_2 t}}$$

$t$ is the thickness of the wall of the sphere;
$R$ is the radius of the sphere;
$v$ is Poisson's ratio; and
$r_o$ is the radius of the area to which the load is applied. In practice, $B$ is a value provided by various tables, such as those found at page 273, Case 17 of "Formulas For Stress And Strain," third edition, 1954, by Raymond J. Roark and published by McGraw-Hill Book Company of New York, Toronto and London. Having solved for the stress, a material having the required stress level may be selected. Conversely, should a particular material be selected, the formula may be employed in solving for the required thickness of the walls of the spheres. By disposing in the outermost strata spheres having a larger diameter and greater wall thickness to sphere diameter ratios, greater amounts of impact force can be absorbed as the shock absorber engages or impacts the impacting surface, since the maximum stress is greater for those spheres.

Furthermore, by successively reducing the T/D ratio of the spheres in succeeding strata, progressing inwardly, the ability to withstand impact is reduced. Consequently, upon impact, the larger quantities of force are dissipated through the fracture and collapse of the spheres near the external surface of the shock absorber and smaller and smaller quantities of force are dissipated by the progressively smaller spheres. Hence, it should be appreciated that the outer strata serve to dissipate the largest quantities of force, while the innermost stratum serves to dissipate the smallest quantities of force, so that the kinetic energy of the payload 14 is dissipated at a selected rate which is proportional to the negative acceleration of the payload as it comes to rest.

Figure 3:
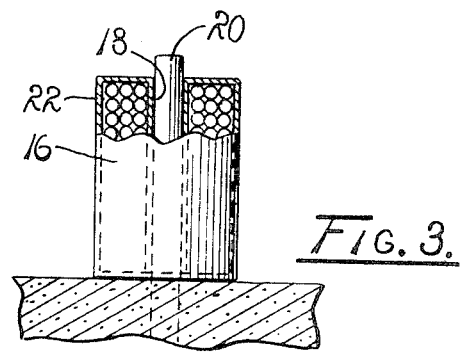
FIG. 3 is a partially sectioned view of a modified form of the shock absorber illustrated in FIGS. 1 and 2.

While the shock absorber has been disclosed as being particularly useful in delivering "hard-landed" payloads to the surfaces of celestial bodies, as well as in delivering payloads employing airdrop techniques, it is to be understood that the shock absorber has utility separate and apart from either of these uses. For example, a shock absorber embodying the principles of the present invention may be formed to assume a configuration of a cylindrical shock absorber 16, FIG. 3. The shock absorber 16 includes an opening 18 into which is inserted an elongated member 20, and, as a practical matter, may comprise a vertical post such as a lamp post, a bridge abutment, a support for a guardrail, or the like, as frequently found along automobile roadways.

Where desired, the shock absorbers 10 and 16 preferably are enclosed in a flexible cover 22 formed of any convenient material such as Plexiglass or the like which serves to contain the fractured glass as impact occurs. However, should the shock absorber be employed in delivering payload to celestial bodies wherein it is desired that the payload be broken-out, the cover 22 can be eliminated so that the payload 14 is caused to be released from the shock absorber once the spheres of the strata are crushed.

Depending upon the intended employment of the shock absorber, various types of adhesive material or bonding agents may be employed in securing the spheres into a unitary structure. Preferably, the bonding agent is a brittle substance, such as epoxy, which accommodates assembly of the spheres into a cohesive structure, while accommodating fracture of the multiple spheres.

Assembly of the shock absorber is achieved by employing numerous techniques. For example, the individual spheres may be treated with adhesive and then deposited about the surface of the payload, or adhesive may be applied to the individual spheres as they are deposited in the various strata. In any event, the resulting shock absorber is provided with an internal and external wall having therebetween a multiplicity of strata formed of individual hollow spheres disposed in a contiguous relationship. Each of the spheres has a T/D ratio such that the spheres may be fractured for absorbing a predetermined quantity of impact energy as the external surface of the shock absorber engages an impacting surface.

Although the invention has been herein shown and described in what is conceived to be the most practical and preferred embodiment, it is recognized that departures may be made therefrom within the scope of the invention.

What is claimed is:

1. A shock absorber adapted for use in a mechanical impact energy absorbing system comprising:
   A. a spherical payload compartment;
   B. a plurality of contiguous, thin walled, hollow bodies of a substantially spherical configuration formed of a brittle material and arranged in spherical strata surrounding said payload compartment, said bodies being so dimensioned that the diameter of the bodies of the outermost stratum is greater than the diameter of the bodies of the innermost stratum; and
   C. a bonding agent impregnating said shock absorber and uniting said bodies into a unitary mass 2. A destructible shock absorber comprising a labyrinth of brittle thin walls defining a multiplicity of isolated substantially spherical compartments, said labyrinth of brittle thin walls being disposed between an object to be protected and a potential source of impact force, the compartments being arranged in contiguous strata and the compartments being of increased size outwardly from the object to be protected for successive collapse inwardly toward said object upon impingement of a destructive impact force thereagainst.

3. A shock absorber for absorbing impact energy comprising a unitary barrier including a plurality of contiguous, thin walled, hollow bodies of a substantially spherical configuration formed of a brittle material and adapted to fracture on impact.

4. A shock absorber according to claim 3 further comprising bonding means fixedly securing said contiguous bodies into a unitary mass with voids being established therebetween.

5. The shock absorber according to claim 3 wherein the bodies are arranged in strata with each stratum containing a plurality of bodies of a common diameter.

6. The shock absorber according to claim 5 wherein the diameter of the bodies of each stratum varies with respect to the diameter of the bodies of the adjacent strata.

7. The shock absorber according to claim 6 wherein the strata are so arranged that the barrier is of a substantially cylindrical configuration.

8. The shock absorber according to claim 6 wherein the strata are so arranged that the barrier is of a spherical configuration and defines a payload cavity therein.

* * * * *